United States Patent
Vonog et al.

(10) Patent No.: US 9,063,704 B2
(45) Date of Patent: Jun. 23, 2015

(54) IDENTIFYING GESTURES USING MULTIPLE SENSORS

(75) Inventors: Stanislav Vonog, San Francisco, CA (US); Nikolay Surin, San Francisco, CA (US); Gleb Dubovik, San Francisco, CA (US)

(73) Assignee: NET POWER AND LIGHT, INC., San Francisco, CA (US)

( * ) Notice: Subject to any disclaimer, the term of this patent is extended or adjusted under 35 U.S.C. 154(b) by 38 days.

(21) Appl. No.: 13/464,152

(22) Filed: May 4, 2012

(65) Prior Publication Data

US 2012/0280905 A1     Nov. 8, 2012

Related U.S. Application Data

(60) Provisional application No. 61/482,968, filed on May 5, 2011.

(51) Int. Cl.
*G06F 1/16* (2006.01)
*G06F 3/01* (2006.01)
*G06F 3/0346* (2013.01)
*G06F 3/038* (2013.01)

(52) U.S. Cl.
CPC .............. *G06F 1/1694* (2013.01); *G06F 3/017* (2013.01); *G06F 3/0346* (2013.01); *G06F 3/038* (2013.01); *G06F 2203/0381* (2013.01)

(58) Field of Classification Search
CPC ....... G06F 1/1694; G06F 3/017; G06F 3/038; G06F 2203/0381
See application file for complete search history.

(56) References Cited

U.S. PATENT DOCUMENTS

| | | | |
|---|---|---|---|
| 7,456,770 B2* | 11/2008 | Cairns .......................... | 341/143 |
| 7,704,135 B2* | 4/2010 | Harrison, Jr. ..................... | 463/7 |
| 7,909,698 B2* | 3/2011 | Onoda et al. .................... | 463/36 |
| 8,698,736 B2* | 4/2014 | Birnbaum et al. ............ | 345/156 |
| 2002/0073417 A1* | 6/2002 | Kondo et al. ..................... | 725/10 |
| 2003/0001908 A1* | 1/2003 | Cohen-solal .................. | 345/863 |
| 2003/0156756 A1* | 8/2003 | Gokturk et al. ............... | 382/190 |
| 2004/0117815 A1* | 6/2004 | Kondo et al. ................... | 725/12 |
| 2004/0174431 A1* | 9/2004 | Stienstra ....................... | 348/155 |
| 2005/0130740 A1* | 6/2005 | Onoda et al. .................... | 463/36 |
| 2006/0040720 A1* | 2/2006 | Harrison ........................... | 463/9 |

(Continued)

FOREIGN PATENT DOCUMENTS

WO    WO-2010-006087 A1    1/2010

OTHER PUBLICATIONS

International Search Report mailed Nov. 1, 2012, of PCT Application No. PCT/US2012/036475, 3 pages.

(Continued)

*Primary Examiner* — Kumar Patel
*Assistant Examiner* — Sejoon Ahn
(74) *Attorney, Agent, or Firm* — Perkins Coie LLP

(57) ABSTRACT

Systems and methods for recognizing human gestures are disclosed. In one embodiment, a method for recognizing a gesture made by an operator with a portable device, may comprise: obtaining a first sensor data profile associated with measurements made by the first sensor while the operator made a specific gesture involving the portable device; obtaining a second sensor data profile associated with measurements made by the second sensor while the operator made the specific gesture involving the portable device; and identifying the specific gesture by analyzing the first sensor data profile and the second sensor data profile.

17 Claims, 3 Drawing Sheets

(56) References Cited

U.S. PATENT DOCUMENTS

| | | | |
|---|---|---|---|
| 2006/0092270 A1* | 5/2006 | Dara-Abrams | 348/14.12 |
| 2007/0139370 A1* | 6/2007 | Lu et al. | 345/156 |
| 2007/0155277 A1* | 7/2007 | Amitai et al. | 446/175 |
| 2007/0294122 A1* | 12/2007 | Johnston | 705/10 |
| 2008/0042987 A1* | 2/2008 | Westerman et al. | 345/173 |
| 2008/0165022 A1* | 7/2008 | Herz et al. | 340/669 |
| 2008/0246734 A1* | 10/2008 | Tsui et al. | 345/169 |
| 2008/0310627 A1* | 12/2008 | Wong et al. | 380/200 |
| 2008/0313146 A1* | 12/2008 | Wong et al. | 707/3 |
| 2009/0157206 A1* | 6/2009 | Weinberg et al. | 700/94 |
| 2009/0265671 A1* | 10/2009 | Sachs et al. | 715/863 |
| 2009/0284950 A1* | 11/2009 | Rubio et al. | 362/86 |
| 2010/0004565 A1* | 1/2010 | Lanfermann et al. | 600/587 |
| 2010/0035688 A1* | 2/2010 | Picunko | 463/39 |
| 2010/0188929 A1* | 7/2010 | Kitaura | 367/13 |
| 2010/0205667 A1* | 8/2010 | Anderson et al. | 726/19 |
| 2010/0295783 A1* | 11/2010 | El Dokor et al. | 345/158 |
| 2010/0321289 A1* | 12/2010 | Kim et al. | 345/156 |
| 2011/0001813 A1* | 1/2011 | Kim et al. | 348/77 |
| 2011/0069024 A1* | 3/2011 | Kim | 345/173 |
| 2011/0080359 A1* | 4/2011 | Jang et al. | 345/173 |
| 2011/0102345 A1* | 5/2011 | Kim et al. | 345/173 |
| 2011/0163976 A1* | 7/2011 | Barnhoefer et al. | 345/173 |
| 2011/0169308 A1* | 7/2011 | Carter et al. | 297/217.3 |
| 2011/0173530 A1* | 7/2011 | Winternitz et al. | 715/243 |
| 2011/0180709 A1* | 7/2011 | Craddock et al. | 250/338.1 |
| 2011/0234488 A1* | 9/2011 | Ge et al. | 345/156 |
| 2011/0239114 A1* | 9/2011 | Falkenburg et al. | 715/702 |
| 2011/0302293 A1* | 12/2011 | Buban | 709/224 |
| 2011/0313768 A1* | 12/2011 | Klein et al. | 704/251 |
| 2011/0319166 A1* | 12/2011 | Bathiche et al. | 463/40 |
| 2012/0092286 A1* | 4/2012 | O'Prey et al. | 345/174 |
| 2012/0131186 A1* | 5/2012 | Klos et al. | 709/224 |
| 2012/0216151 A1* | 8/2012 | Sarkar et al. | 715/863 |
| 2012/0239396 A1* | 9/2012 | Johnston et al. | 704/235 |
| 2013/0182892 A1* | 7/2013 | Horvitz et al. | 382/103 |
| 2014/0142729 A1* | 5/2014 | Lobb et al. | 700/90 |

OTHER PUBLICATIONS

Written Opinion mailed Nov. 1, 2012, of PCT Application No. PCT/US2012/036475, 6 pages.

* cited by examiner

IDENTIFYING GESTURES USING MULTIPLE SENSORS

CROSS-REFERENCE TO RELATED APPLICATIONS

This application claims the benefit of priority under 35 U.S.C. 119(e) to U.S. Provisional Patent Application Ser. No. 61/482,968 filed May 5, 2011, entitled "IDENTIFYING GESTURES USING MULTIPLE SENSORS" and naming inventors Stanislav Vonog, Nikolay Surin, and Gleb Dubovik, which is incorporated herein by reference in its entirety.

TECHNICAL FIELD

The present disclosure relates to the use of gestures to facilitate a human-computer interface.

BACKGROUND

Using gestures as a means for interfacing with portable devices is becoming commonplace. For example, current Android based phones can control access through sensing and accepting security gestures in place of alphanumeric passwords. Such gestures are typically recognized by analyzing kinematic (motion related) data provided by sensors found in the portable device. Kinematic sensors include accelerometers, gyroscopes, magnetometers, etc.

While analysis of kinematic data profiles can identify some gestures in certain circumstances, other gestures are not readily and/or uniquely identified by their kinematic profiles. By way of example, consider recognition of a "clapping gesture," where the clapping gesture is accomplished by an operator holding a portable device in the palm of one hand, and clapping both hands together. Perhaps the primary characteristic of this clapping gesture's kinematic profile is that the ends of the profile each tend to have relatively large impulse acceleration/deceleration vectors. However, this profile characteristic could apply to many gestures, such as the operator rapidly waving the portable device in the air.

BRIEF DESCRIPTION OF DRAWINGS

These and other objects, features and characteristics of the present disclosure will become more apparent to those skilled in the art from a study of the following detailed description in conjunction with the appended claims and drawings, all of which form a part of this specification. In the drawings:

DETAILED DESCRIPTION

Figure 1:
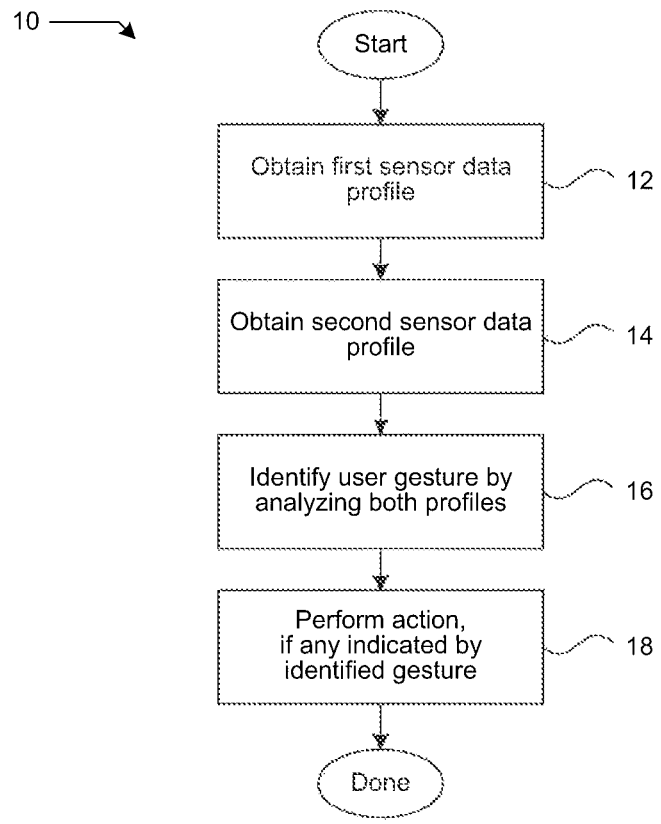
FIG. 1 illustrates a flow chart showing a set of exemplary operations 100 that may be used in accordance with one embodiment of the present disclosure.

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below or elsewhere in the specification to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Systems and methods for recognizing human gestures are described. In some embodiments, the present disclosure contemplates a variety of methods and systems for recognizing a complex gesture by using data from at least two disparate sensors. The complex gesture may include, but is not limited to, kinematic based gestures, such as clapping, and multi-layered gestures, such as spell casting.

In some embodiments, a system for recognizing human gestures may include a portable device and two disparate sensors to determine whether an event is measured corresponding to a gesture, and if so, to identify the gesture. In some implementations, the portable device may have a position sensor and an audio sensor. The portable device may be configured to analyze data from two or more disparate sensors to identify or recognize a gesture made by a human holding the portable device. By analyzing sensor data profiles from two or more disparate sensors, better gesture recognition and less false recognition can be accomplished for a variety of gestures.

Some embodiments may provide a portable device and two or more disparate sensors. Data from two or more sensors may be utilized to identify or recognize a human gesture. In some embodiments, two or more sensors may be integral to the portable device. In some embodiments, one or more of the disparate sensors may be separate from the portable device, and its or their sensor data may be transmitted to the portable device for use.

In some embodiments, there may be no portable device, but a variety of sensors that the operator may interface with, such as a 3D camera, motion sensors, etc. Better gesture recognition may be provided for a variety of gestures by analyzing sensor data profiles from two or more disparate sensors. In some embodiments, complex gestures, which have a kinetic aspect and another aspect (e.g., audio, image, or pressure), may be recognized by using the variety of disparate sensors.

Some embodiments may provide gesture recognition of a gesture corresponding to a specific motion made by an operator (or other suitable kinematic event), such as the operator waving the portable device. From the perspective of the operator, the intended gesture is defined by the kinematic profile of the gesture, which may include acceleration, deceleration, velocity and/or direction of the portable device. However, if only the kinematic profile is analyzed, unintended motion made by the operator may often be identified as intended gestures. Sensor data profiles from other sensors may contain information useful in identifying the operator's intended gestures. By analyzing sensor data from multiple disparate sensors, gesture recognition may be provided for complex gestures such as gestures that consist of motion and sound, motion and image, motion and pressure etc. For example, the operator's voice or pressure from the operator holding the portable device may be combined with the kinematic profile to recognize a complex human gesture.

In some embodiments, a system for recognizing an operator's gestures may be configured to analyze complex gestures according to at least multiple distinct inputs of gestures from the operator. In some implementations, the multiple distinct inputs may include predefined gestures that are unlikely to be made unintentionally. A gesture pattern of an operator may be generated and dynamically constructed or expanded according to predefined machine learning algorithms. For example, the operator's gestures may be analyzed over time and added to the operator's gesture pattern. In some embodiments, the system may be configured to allow an operator to adjust the sensitivity of gesture recognition functions provided to the operator. In some embodiments, the system may be configured to provide an operator a set of predefined functions of gesture recognition sensitivity according to the operator's physical characteristics, such as height, gender, etc. In some embodiments, the system may be configured to allow an operator to disable the gesture recognition functions.

FIG. 1 illustrates a flow chart showing a set of exemplary operations 10 that may be used in accordance with embodiments of the present disclosure. At step 12, a first sensor data profile corresponding to a specific sensed event may be obtained. The specific sensed event possibly corresponds to a human gesture made with a portable device. At step 14, a second sensor data profile corresponding to the specific sensed event may be obtained. The sensor data profiles may correspond with substantially identical time windows, although not necessarily. The first sensor and the second sensor are disparate, i.e., they sense different parameters. For example, the first sensor may be a kinematic sensor such as an accelerometer and the second sensor may be an audio input such as a microphone. The sensor data profile could correspond to raw sensor data, although it is more likely that processing may be performed on the sensor data to create a more useful or meaningful set of data for each profile. For example, accelerometer data from an iPhone© is reported as local G-force values along three axes X, Y, and Z. This data can be used to generate local velocity and/or position values, or even absolute velocity and/or position values with respect to some specific references. Thus, here the kinematic sensor data profile used for analysis may include local and/or absolute acceleration, velocity and position information over the time window of the specific sensed event.

In any event, once the method 10 has obtained sensor data profiles from two or more sensors corresponding to the same event, a step 16 may analyze both sensor data profiles to determine whether the operator intended a gesture, and if so, identify the gesture. Analysis of sensor data profiles can be accomplished by a variety of mechanisms. For example, the profiles may be normalized and compared to a database of known profiles. In some embodiments, analysis of the sensor data may be an ongoing process such that steps 12-16 are performed substantially simultaneously. When a specific gesture can be identified, a step 18 may initiate or implement any action indicated by the specific identified gesture.

By way of example, but not limitation, the "clapping gesture" may be more readily distinguished and identified by analyzing both a kinematic sensor profile and an audio sensor profile. An operator may make a clapping gesture by holding a portable device in the palm of a first hand, and clapping the portable device into the palm of a second hand. An audio profile of this event may show impulse sound signals as the device made contact with the second hand, and otherwise simply show the "whoosh" effect of air moving past the audio input device during motion. The kinematic sensor profile may have a series of acceleration/deceleration impulses. The response of the system to having identified a clapping gesture could be to generate a clapping sound, and/or to perform a predetermined function associated with the clapping gesture. The clapping sound may be distinct for different operators and may be a function of various magnitudes and frequencies found in the sensor data profiles.

An example of a complex gesture is a spell gesture, which is a useful event in various applications, e.g. in a gaming context. The event could involve a simple gesture while incanting words of a spell. A particular gesture and incantation combination may correspond to a particular spell. Alternatively, there may be a spell gesture which indicates to the system that the corresponding spoken words are an incantation. The spell gesture may be performed prior to incantation, partially overlapping, or substantially simultaneously.

In some embodiments, the present disclosure contemplates methods and systems for gesture recognition by using three or more sensor data profiles, e.g., using any desired combination of motion, audio, proximity, geolocation, image profiles, pressure etc.

As will be appreciated by one of ordinary skill in the art, the gesture method 10 may be instantiated locally, e.g. on a local computer or a portable device, and may be distributed across a system including a portable device and one or more other computing devices. For example, the method 10 may determine that the available computing power of the portable device is insufficient or additional computer power is needed, and may offload certain aspects of the method to the cloud.

Figure 2:
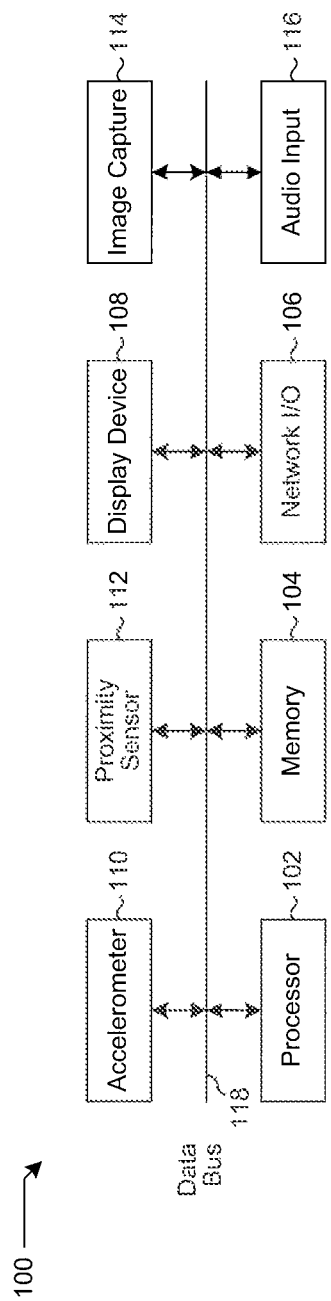
FIG. 2 illustrates an exemplary portable device according to another embodiment of the present disclosure.

FIG. 2 illustrates an exemplary portable device 100 in accordance with yet another embodiment of the present disclosure. The architecture and components of the portable device 100 are merely illustrative. Those skilled in the art will immediately recognize the wide variety of suitable categories and specific devices such as a cell phone, an iPad©, an iPhone©, a portable digital assistant (PDA), etc. In this simplified example, the portable device 100 includes a processor 102, a memory 104, a network I/O device 106, a display device 108, and a plurality of sensors such as accelerometer 110, a proximity sensor 112, an image capture device 114, and an audio input device 116, all in communication via a data bus 118. The processor 102 may include one or more of a central processing unit (CPU) and a graphics processing unit (GPU). The memory 104 may include a random access memory (RAM) or other dynamic storage device for storing information, i.e. operator gesture patterns, and programs/instructions to be executed by the processor 102. The memory 104 may be used for storing temporary variables or other intermediate information during execution of programs/instructions by the processor 102. The memory 104 may also include a read only memory (ROM) and/or other static storage device for storing static information and programs/instructions for the processor 102. The memory 104 may further include a mass storage device, such as a magnetic disk or optical disc and its corresponding drive for storing information, i.e. operator gesture patterns, and instructions.

The programs/instructions stored in the memory 104, when executed by the processor 102, may cause the processor 102 to perform certain operations. In some embodiments, the operations may include, but are not limited to, obtaining a first sensor data profile associated with measurements made by the first sensor while the operator made a specific gesture involving the portable device; obtaining a second sensor data profile associated with measurements made by the second sensor while the operator made the specific gesture involving the portable device; and identifying the specific gesture by analyzing the first sensor data profile and the second sensor data profile.

In another embodiment(s), the operations may include, receiving sensor data from a plurality of sensors, wherein at least two of the plurality of sensors are disparate, and wherein the sensor data is associated with an event; analyzing the sensor data to determine whether the event corresponds to an operator gesture; and when the event corresponds to the operator gesture, performing or initiating a predefined action indicated by the operator gesture.

In yet another embodiment(s), the operations may include, analyzing a first profile based on data from a kinematic sensor, the first profile corresponding to a specific event; analyzing a second profile based on data from an audio input, the second profile corresponding to the specific event; and determining whether the first profile and the second profile indicate that the specific event is a clapping gesture.

In yet another embodiment(s), the operations may include, analyzing a first profile based on data from a kinematic sensor, the first profile corresponding to a specific event; analyzing a second profile based on data from an audio input, the second profile corresponding to the specific event; determining whether the first profile and the second profile indicate that the specific event is a spell; and, when the specific event is determined to be a spell, performing or initiating a predefined action indicated by the spell.

Figure 3:
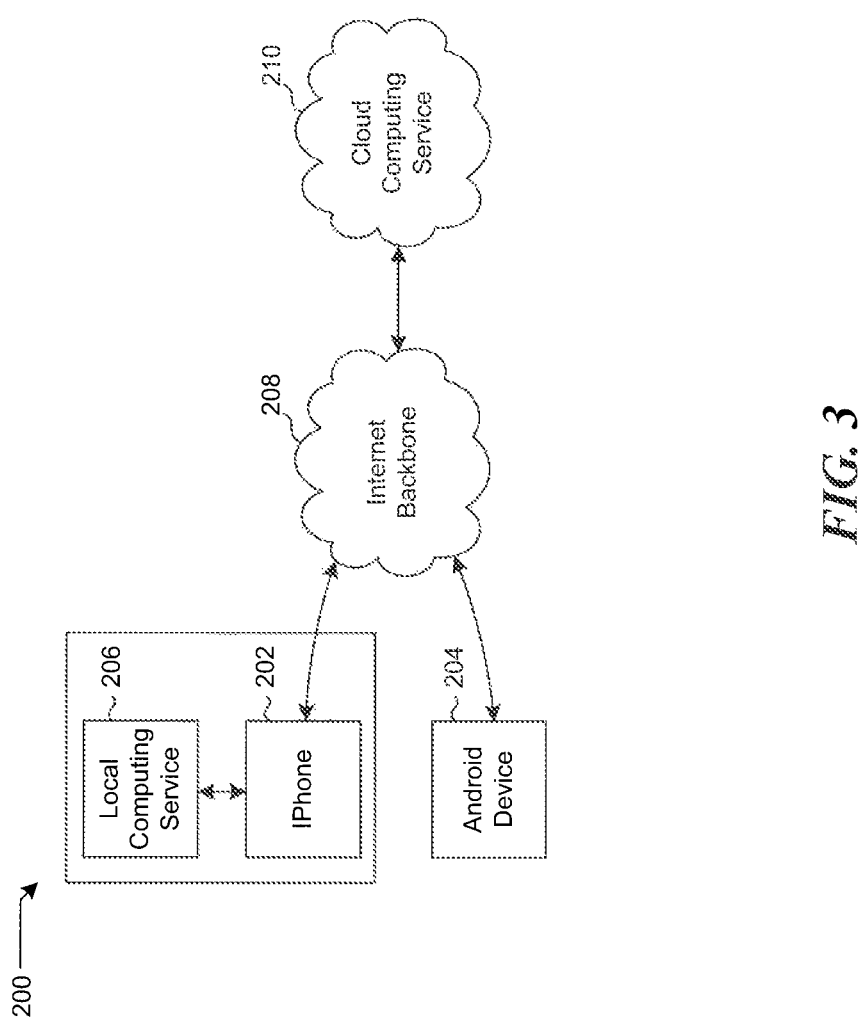
FIG. 3 illustrates an exemplary system according to yet another embodiment of the present disclosure.

FIG. 3 illustrates an exemplary system 200 suitable for identifying a gesture. The system 200 may include a plurality of portable devices such as iPhone© 202 and Android© device 204, a local computing device 206, and an Internet connection coupling the portable devices to a cloud computing service 210. In some embodiments, gesture recognition functionality and/or operator gesture patterns may be provided at cloud computing service 210 and be available to both portable devices, as the application requires.

In general, the routines executed to implement the embodiments of the disclosure may be implemented as part of an operating system or a specific application, component, program, object, module or sequence of instructions referred to as "programs." The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually affect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps or employ systems having blocks in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples—alternative implementations may employ differing values or ranges.

The teaching of the disclosure provided herein can be applied to other systems, not necessarily only the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer implemented method for recognizing a clapping gesture made by an operator with a portable device and generating an applause response, the portable device including at least a kinematic sensor and an audio sensor, the computer implemented method comprising:
   obtaining a kinematic sensor data profile associated with measurements made by the kinematic sensor while the operator performs a specific gesture involving the portable device during a time window having a beginning and end;
   wherein, the specific gesture includes the operator holding the portable device in a palm of a first hand and clapping the portable device into a palm of a second hand;
   obtaining an audio sensor data profile associated with measurements made by the audio sensor while the operator performs the specific gesture involving the portable device;
   wherein, the audio sensor data profile corresponds with a substantially identical time window as the kinematic sensor data profile;
   analyzing the kinematic sensor data profile and the audio sensor data profile;
   wherein the analyzing comprises:
      normalizing the kinematic sensor data profile and audio sensor data profile;
      comparing the normalized kinematic sensor data profile and normalized audio sensor data profile against a database of known sensor data profiles;
      wherein, the database of known sensor data profiles comprises at least a first known sensor data profile known to correspond to a clapping gesture, the first known sensor data profile is characterized by an acceleration impulse near the beginning of the time window, a deceleration impulse near the end of the time window, and an audio signal impulse near the end of the time window;
   determining that the specific gesture corresponds to a clapping gesture based on the analyzing of the kinematic sensor data profile and the audio sensor data profile; and
   in response to determining that the specific gesture corresponds to a clapping gesture, generating an applause response;
   wherein, the applause response comprises an audio output component; and
   wherein, the audio output component of the applause response is based on the kinematic sensor data profile and the audio sensor data profile.

2. A computer implemented method as recited in claim 1, further comprising: generating a gesture pattern for the operator according to multiple distinct inputs of gestures from the operator.

3. A computer implemented method as recited in claim 2, wherein the gesture pattern is dynamically constructed or expanded by analyzing the operator's gesture pattern over time using predefined machine learning algorithms.

4. A computer implemented method as recited in claim 3, further comprising: storing the operator's gesture pattern on the portable device and/or a cloud computing service.

5. A computer implemented method as recited in claim 1, wherein the kinematic sensor is an accelerometer, and the audio sensor is a microphone.

6. A computer implemented method as recited in claim 1, wherein the portable device further comprises a pressure sensor.

7. A computer implemented method as recited in claim 6, the method further comprising:
   obtaining a pressure sensor data profile associated with measurements made by the pressure sensor while the operator performs the specific gesture involving the portable device;
   analyzing the pressure sensor data profile, wherein the analyzing comprises:
      normalizing the pressure sensor data profile; and
      comparing the normalized pressure sensor data profile against the database of known sensor data profiles;
      wherein, the database of known sensor data profiles includes at least a second known sensor data profile known to correspond to a clapping gesture, the second known sensor data profile characterized by an acceleration impulse near the beginning of the time window, a deceleration impulse near the end of the time window, an audio signal impulse near the end of the time window, and a pressure impulse near the end of the time window; and
   determining that the specific gesture corresponds to a clapping gesture based on the analyzing of the pressure sensor data profile, kinematic sensor data profile, and the audio sensor data profile.

8. A system for recognizing clapping gestures, the system comprising:
   a portable device including at least a kinematic sensor and an audio sensor; and
   a gesture recognition process executing on the system, the gesture recognition process operable to:
      obtain a kinematic sensor data profile associated with measurements made by the kinematic sensor while an operator performs a specific gesture involving the portable device during a time window having a beginning and an end;
      wherein, the specific gesture includes the operator holding the portable device in a palm of a first hand and clapping the portable device into a palm of a second hand;
      obtain an audio sensor data profile associated with measurements made by the audio sensor while the operator performs the specific gesture involving the portable device;
      wherein, the audio sensor data profile corresponds with a substantially identical time window as the kinematic sensor data profile;

analyze the kinematic sensor data profile and the audio sensor data profile, wherein the analysis comprises:

normalizing the kinematic sensor data profile and audio sensor data profile; and comparing the normalized kinematic sensor data profile and normalized audio sensor data profile against a database of known sensor data profiles;

wherein, the database of known sensor data profiles includes at least a first known sensor data profile known to correspond to a clapping gesture, the first known sensor data profile characterized by an acceleration impulse near the beginning of the time window, a deceleration impulse near the end of the time window, and an audio signal impulse near the end of the time window;

determine that the specific gesture corresponds to a clapping gesture based on the analysis of the kinematic sensor data profile and the audio sensor data profile; and in response to determining that the specific gesture corresponds to a clapping gesture, generate an applause response;

wherein the applause response comprises an audio output component;

wherein the audio output component of the applause response is based on the kinematic sensor data profile and the audio sensor data profile.

9. A system for recognizing clapping gestures as recited in claim 8, wherein the gesture recognition process executes on the portable device.

10. A system for recognizing clapping gestures as recited in claim 8, wherein the gesture recognition process is distributed across multiple computing devices and/or a cloud computing service.

11. A system for recognizing clapping gestures as recited in claim 8, wherein the gesture recognition process is further operable to generate a gesture pattern for the operator according to multiple distinct inputs of gestures from the operator.

12. A system for recognizing clapping gestures as recited in claim 11, wherein the gesture pattern is dynamically constructed or expanded by analyzing the operator's gesture pattern over time using predefined machine learning algorithms.

13. A system for recognizing clapping gestures as recited in claim 12, wherein the gesture recognition process is further operable to store the operator's gesture pattern on the portable device, multiple computing devices, and a cloud computing service.

14. A system for recognizing clapping gestures as recited in claim 8, wherein the kinematic sensor is an accelerometer, and the audio sensor is a microphone.

15. A system for recognizing clapping gestures as recited in claim 8, wherein the portable device further comprises a pressure sensor.

16. A system for recognizing clapping gestures as recited in claim 15, wherein the gesture recognition process is further operable to:

obtain a pressure sensor data profile associated with measurements made by the pressure sensor while the operator performs the specific gesture involving the portable device;

wherein, the pressure sensor profile corresponds with a substantially identical time window as the kinematic sensor data profile;

analyze the pressure sensor data profile, wherein the analysis comprises:

normalizing the pressure sensor data profile; and comparing the normalized pressure sensor data profile against the database of known sensor data profiles;

wherein, the database of known sensor data profiles includes at least a second known sensor data profile known to correspond to a clapping gesture, the second known sensor data profile characterized by an acceleration impulse near the beginning of the time window, a deceleration impulse near the end of the time window, an audio signal impulse near the end of the time window, and a pressure impulse near the end of the time window; and determine that the specific gesture corresponds to a clapping gesture based on the analysis of the pressure sensor data profile, kinematic sensor data profile, and the audio sensor data profile.

17. A system for recognizing clapping gestures as recited in claim 8, wherein the system is configured to provide the operator a set of predefined functions of gesture recognition sensitivity according the operator's physical characteristics.

* * * * *